June 16, 1959

W. G. PFANN 2,890,940

ELECTROMAGNETIC STIRRING METHOD

Filed June 25, 1957

INVENTOR
W.G. PFANN
BY
*George S. Indig*
ATTORNEY

United States Patent Office 2,890,940
Patented June 16, 1959

2,890,940

ELECTROMAGNETIC STIRRING METHOD

William G. Pfann, Far Hills, N.J., assignor to Bell Telephone Laboratories, Incorporated, New York, N.Y., a corporation of New York Application June 25, 1957, Serial No. 667,752

7 Claims. (Cl. 23—295)

This invention relates to electromagnetic stirring methods. The methods herein are suitable for use in the stirring of liquid materials at low and elevated temperatures where the use of mechanical stirring means may introduce undesirable impurities into the liquid or may be impractical for other reasons.

The invention herein described and claimed makes use of the reactive force which results from the interaction of an electric current passing through the material to be stirred and a magnetic field impressed across the liquid material at an angle to the direction of current flow. In my copending application for United States Letters Patent, Serial No. 523,691, filed July 22, 1955, I describe and claim electromagnetic stirring methods dependent upon such a reactive force resulting from the interaction of current flowing through the liquid and a magnetic field impressed across the liquid. It is essential to the processes of my copending application that the reactive force resulting from the interaction of electric current flow and magnetic field be non-uniform across the liquid portion so as to result in agitation.

Insofar as the stirring methods of my copending application and my present application are both dependent upon such a reactive force to produce liquid movement, the principles of operation are similar. However, whereas the processes of my earlier application depend for their operation upon the presence of a non-uniform reactive force and whereas in those processes the net force resulting in liquid movement is dependent on the net difference in magnitude of such non-uniform force so that some of the reactive force so produced may actually oppose liquid movement, the processes of the present application make use of a liquid body and magnetic field configuration such that essentially the entire reactive force is unopposed in producing unidirectional liquid flow.

It is a requirement of the processes of this invention that the material to be stirred be contained within a container having an annular cross-section or that it otherwise have a ring-shaped or other hollow center configuration. Since a recommended species of the zone-refining processes makes use of such a hollow cylindrical container, the processes herein are of particular importance when used in conjunction with such zone-melting processes whether the utlimate objective be zone-refining, zone-leveling, or for any other purpose for which material is zone-melted. The stirring methods of this invention are, of course, also suitable for use in conjunction with normal freezing operations or any other type of process in which it is desirable to stir a liquid material of hollow cross-section providing, of course, such material will pass sufficient current by conduction or other mechanism to result in a reactive force of sufficient magnitude when a magnetic field is imposed across such a current-carrying liquid.

In essence, the methods of this invention produce stirring within a body of liquid having an annular or other hollow cross-section by causing electrical current to flow through at least a portion of the liquid in the general direction of the axis of the annular section while impressing a magnetic field across such portion of the liquid, for example, by means of two magnetic poles, one within the section and one without. In the preferred embodiment the reactive force so produced is at right angles to both the direction of current flow and the magnetic field so that essentially the entire reaction so produced results in liquid motion throughout the section about its axis. Such liquid flow although essentially unidirectional may have turbulent components which components may be brought about either within a smooth-walled container with a reactive force of suitable magnitude or may be brought about under the influence of roughened wall or container obstacles placed therein for such purpose.

Electromagnetic stirring methods have particular importance in the processing of metals and semiconductor materials in which molten phases of the material undergoing treatment are involved. Such a process known as "zone-melting" is described in the Transactions of the American Institute of Mining and Metallurgical Engineers, volume 194, pages 747–753, 1952. Since the stirring methods of this invention are particularly advantageous in conjunction with a zone-melting process in which an annular cross-section is used, these methods are described primarily in terms of such a process. It is, however, to be understood that the methods herein are not to be so limited.

Since the principles of zone-melting are well known at this time, it is unnecessary to fully describe the mechanism there involved. It should, however, be recalled that whether the zone-melting processes be used for purifying such as in zone-refining or for other resegregation or distribution as in zone-leveling, the process is completely dependent upon the so-called distribution coefficient sometimes represented by the symbol $k$ or $\gamma$. It is significant that the distribution coefficient, which is a measure of the preference of a solute for the solid or the liquid phase of two such phases in intimate contact, is subject to considerable variation from its theoretical value by reason of growth conditions such as growth rate of such an interface or stirring of the liquid material adjacent such an interface.

It is well known that the efficiency of resegregation in any zone-melting process is dependent upon the absolute magnitude of the quantity $(1-k)$, in which $k$ is the segregation coefficient, and also that the effective value of $k$ tends to approach unity both with increasing growth rate and with decreasing stirring within the molten region adjacent the position of the interface. It follows, therefore, that the efficiency of such a zone-melting process may generally be increased by introducing or increasing the stirring of liquid material in such position. Accordingly, many stirring methods applicable to zone-melting have been introduced and are in use today. Such methods include mechanical stirring and inductive stirring in which latter the inductive source may also be the heating source. In the latter method the degree of stirring may be varied independent of the extent of heating by introducing secondary heat sources such as graphite rings between the molten material and the inductive heating source. See "Ferrous Process Melting," John L. Bray, John Wiley and Sons, 1954, page 359. Inductive stirring, however, lacks the control and flexibility of the methods herein and requires an inductive heater which is relatively costly and bulky and which is not justified unless such a heater is required by reason, for example, of its large heat generation. By comparison, the methods herein described may be used with any type of heating apparatus as, for example, resistance heaters, and requires relatively inexpensive equipment.

Mechanical agitation of liquid materials especially in the processing of high melting or reactive materials may be undesirable. Structural materials suitable for use in elements coming in contact with the liquid to be stirred must withstand elevated temperatures while maintaining their structural rigidity, and must be free of undesirable elements which result in contamination. Another objection to mechanical agitation is the usual requirement of the insertion of a rod or other motivating means through the wall of a crucible within which there is maintained a protective atmosphere.

Although some of the complexities of mechanical agitation may be avoided by the use of a magnetic member within the molten region responsive to, but not mechanically connected with, a second magnetic member outside the crucible, avoidance of contamination is still a problem. Further, at the melting temperatures of many materials now processed by zone-melting such as, for example, silicon, the residual magnetism of ferromagnetic material is negligible.

The present method, in relying upon the interaction of a current passing through the molten region with a magnetic field impressed across the molten region, avoids all of the disadvantages of the mechanical processes, avoids the bulk and expense of the inductive processes, avoids direct contacting of magnetic materials with the liquid to be stirred, and in addition, has certain special advantages.

Three contributions made to the processing art by the instant invention may be stated as follows:

(1) In zone-refining or in normal freezing the agitation of the molten zone results in an increase in efficiency of separation at a given rate or permits a more rapid freezing rate for a desired separation.

(2) Electromagnetic stirring within the molten zone in zone-melting processes decreases the frequency and severity of non-uniformities in concentration of the minor ingredient over the area of the freezing interface. Uniformity of concentration of minor ingredient in the plane of such a cross-section taken in the final ingot is desirable, especially in zone-leveled materials to be incorporated in devices without further molten phase processing.

(3) Agitation of the molten material in a molten zone by electromagnetic stirring has the effect of decreasing the thickness of the diffusion layer of solute adjacent the advancing or receding solid-liquid interface. As outlined in paragraph 1 above, it is generally advantageous to minimize the thickness of this layer. However, it is also possible to produce desired concentration changes or gradients within zone-melted material by varying the thickness of this diffusion layer by varying or removing the stirring current or the impressed field during processing.

Reference is had to the following drawings in the description of this invention.

Figure 1:
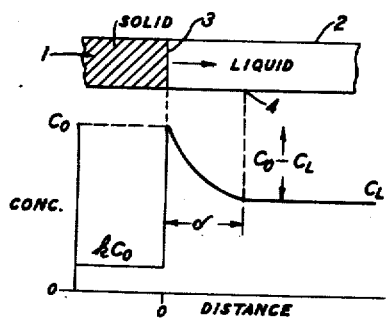
Fig 1 is a schematic diagram of a fusible body through which a solid-liquid interface is moving. The accompanying plot on coordinates of concentration versus distance in the body is referred to in the theoretical section of this description.

Referring again to Fig. 1, the instance depicted is that of solid 1 advancing into a melt of liquid 2 of solute concentration $C_L$ in the steady state for $k$ less than 1, in which $k$ is the distribution coefficient here defined as the equilibrium ratio of solute concentration in the freezing solid to that in the main body of the liquid. The concentration of the freezing solid is assumed to be $kC_0$ where $C_0$=the melt concentration at the interface. A solute-rich from layer interface 3 to cross-sectional area 4 of thickness $\delta$ forms in liquid zone 2 due to an accumulation of solute in the liquid at the interface. The thickness of layer 3—4, $\delta$, decreases with increased diffusity of solute in the liquid phase. Because of the accumulation of solute in layer 3—4, the concentration of such solute in solid 1 is greater than that dictated by the body concentration, thereby effectively resulting in a new segregation coefficient here denoted $k_{\text{eff}}$. In this instance, $k_{\text{eff}}$ is greater than the equilibrium value of distribution coefficient $k$, thereby resulting in decreased separation efficiency. Any procedure which has the effect of reducing the height $C_0$—$C_L$ results in a reduction of the value of $k_{\text{eff}}$. In the steady state for a given chemical system and for a given freezing rate, the height of the layer 3—4, $C_0$—$C_L$, increases with its thickness $\delta$. Hence, a reduction in $\delta$ results in a decrease of the value of $k_{\text{eff}}$.

The situation is analogous for a $k$ greater than one system. In such a system $k_{\text{eff}}$ also approaches unity as growth conditions become less ideal. Increased stirring again decreases layer thickness $\delta$ and causes $k_{\text{eff}}$ to approach $k$ which, however, increases the effective coefficient.

Stirring of the liquid in the molten zone 2 has the effect of reducing $\delta$. The greater the stirring rate, that is, the greater the mean velocity of the liquid in the vicinity of the interface, the smaller will be $\delta$. The theory of enriched layers and the effect of rotational stirring on $\delta$ and $k_{\text{eff}}$ is set forth in the Journal of Chemistry and Physics, volume 21, page 1987 et seq., 1953. Data for significant impurities for germanium is also given in this reference. From this publication it is concluded, for example, that the growth rate R for germanium-antimony ingots grown by crystal pulling can be increased from 38 to 62 microns per second without increasing $k_{\text{eff}}$ if the rotation rate of the crystal is increased from 57 revolutions per minute to 104 revolutions per minute simultaneously. For lower rotation rates a greater proportionate increase in R results from a given increase in rotation rate. As a first approximation in crystal pulling, the stirring velocity may be assumed to be proportional to the rotation rate of the crystal.

In the processes herein, the stirring velocity, V, adjacent the given interface depends on many factors including the value of field intensity, H, the value of stirring current I, the physical dimensions of the liquid section or body, the viscosity of the liquid, the exact nature of the stirring patterns set up by the interaction of H and I, such as the degree of turbulence, and the magnitude of field intensity in the liquid. In general, many of these factors are fixed by the nature of the system and the desired characteristics of the end product. Although it is conceivable that the dimensions, that is, the length and cross-section of the zone, will be chosen with a view toward desirable stirring characteristics in commercial application, it is more probable that the designer of stirring apparatus will be chiefly concerned with the parameters of stirring current I and the magnitude of field intensity. In general, the value of stirring current I will depend on practical considerations such as available voltage and the limit of $I^2R$ heating effect which may be tolerated. As to the latter, there may, of course, be instances in which the $I^2H$ heating effect is relied upon, either partially or solely, as the heating source resulting in the molten region. Some ramifications of this last possibility are discussed.

The magnitude of field intensity is also dependent upon practical considerations such as the size and strength of commonly available permanent commercial magnets or the current available if an electromagnet is used and the size of the air gap between pole pieces across the zone which in turn is dependent upon the dimensions of the zone. Where the material undergoing treatment has a high melting point, such as for example, germanium or silicon having melting points of 937° C. and 1412° C., respectively, which are well above the Curie point of the common ferromagnet substances, the minimum permissible air gap may be determined by the maximum permissible operating temperature for the magnetic material. It may be desirable to cool the magnetic faces, as for example, by the use of a water jacket. The use of standard commercially available bar magnets and an air gap of 1 inch may result in field intensity values of as high as about 25,000 oersteds.

Since in the methods herein, stirring results from the interaction of only the components of current I and field intensity H normal to each other, maximum stirring results when the total values of H and I are normal. The methods herein work equally well with the axis of the annular section vertical, horizontal or at any angle in between. Turbulent flow is generally to be desired in that such flow is more effective in reducing the film thickness $\delta$ than is an equal volume movement of liquid in laminar flow.

Figure 2:
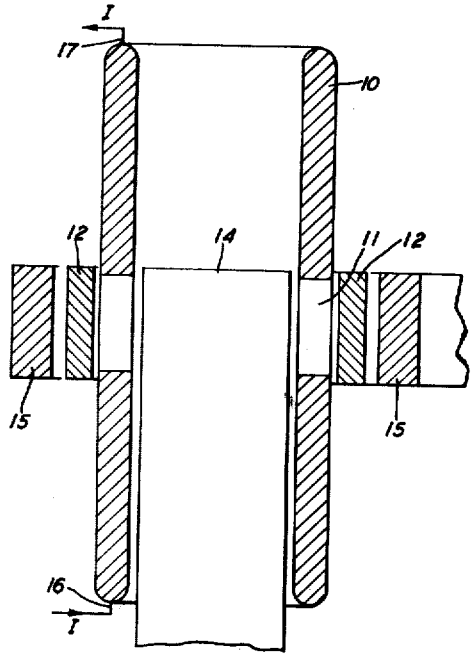
Fig. 2 is a schematic view of apparatus suitable for producing a stirred molten body in accordance with this invention.

Fig. 2 shows a hollow body of material 10 containing a molten region 11 which may, for example, be a molten zone in a zone-melting process. Molten zone 11 is produced in solid ingot 10 by ring-type heater 12 which may, for example, be of the resistance type. A magnetic field is impressed across molten zone 11 by means of magnetic pole 14 of one polarity and 15 of opposite polarity. An electrical potential introduced across electrodes 16 and 17 by a source not shown produces a flow of current through ingot 10. The right angle components of the magnetic field produced by poles 14 and 15 and the electrical current flowing from electrode 16 to electrode 17 result in a reactive force at right angles to the plane of such components so as to produce flow of liquid material in zone 11 in a circumferential path throughout the hollow zone. In the embodiment shown, magnetic pole 15 is a ring-shaped section surrounding the entirety of molten zone 11 so as to result in substantially uniform radial magnetic field encompassing all of zone 11. Although this configuration is ideal, resulting in a uniform reactive force clockwise or counterclockwise, depending on the direction of current flow in magnetic field throughout the zone, the use of a simple bar magnet or of spaced bar magnets of the same polarity about zone 11 also results in circumferential liquid flow.

The nature of the apparatus depicted in Fig. 2 is such that a turbulent flow of liquid results within zone 11. Where it is desirable to have a certain additional amount of turbulence, this may be obtained by use of projections on the inner crucible walls or by use of baffles inserted for that purpose.

Figure 3A:
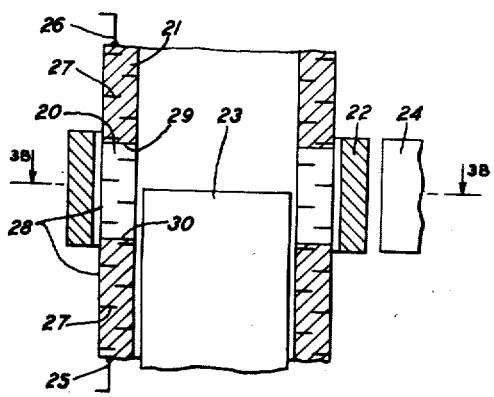
Figs. 3A and 3B are schematic front elevation and plan views, both in section, respectively, of apparatus alternative to that of Fig. 2.
Figure 3B:
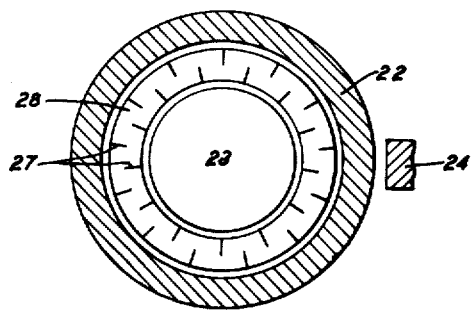

The section shown in Figs. 3A and 3B depicts the use of baffles inserted for the purpose of increasing turbulent flow. In the apparatus depicted, a molten zone 20 with an ingot 21 is produced by heater 22, and the interaction of a magnetic field produced across zone 20 by magnetic poles 23 and 24 of opposite polarity and electrical current flow through zone 20 resulting from electrical source, not shown, connected across electrodes 25 and 26 results in movement of liquid material within zone 20 in a generally circumferential path as in the apparatus of Fig. 2. Baffles or deflectors 27 which may be in the form of pins or rods and which may be an integral part of annular container 28 impede steady state flow and result in turbulence. In the usual system the introduction of turbulence and consequent liquid flow which is non-parallel with the interfaces 29 and 30 more efficiently stirs the material in the vicinity of the growing interface so as to further reduce $\delta$. Where the thermal conductivity of the material 21 undergoing processing is small, the use of baffles 27 made of a good thermal conductive material permits efficient control of zone dimensions for a thicker annular section with given heating apparatus.

In the apparatus of Figs. 3A and 3B since magnet 24 which may be a simple bar magnet does not encompass the entire zone 20, the reactive force is produced only in that portion of molten zone 20 traversed by the magnetic field of the magnet. Although this configuration of magnetic poles, assuming a given field intensity does not result in the same volumetric stirring as produced by the configuration of Fig. 2, use of such apparatus may be dictated because of the reduction in apparatus cost. Depending on the number and size of baffles 27, it may be desirable to add additional magnetic poles 24 about the circumference of molten zone 11. The indicated position of magnet 23 relative to zone 20 is alternative to that shown in Fig. 2. While the stirring efficiency is generally reduced thereby, such a spacing may be preferred for example to avoid overheating of the magnet. Use of an inserted magnet, with a pole face just beyond the zone, may be desirable for the same reason.

For a given configuration and material, the degree of stirring within a molten region is dependent only upon the magnitude of the magnetic field intensity and the magnitude of electric current flow. The magnetic poles may in the simplest embodiment be the two poles of a simple horseshoe magnet or may be independent pole portions. Permanent magnets or electric magnets may be used. Although the use of time invariant current flow and magnetic field intensity are desirable, where the thickness of layer $\delta$ is to be maintained constant, as in the usual zone-leveling process, certain other uses suggest variations in either or both components so as to produce gradually or sharply varying magnitudes of reactive force. For example, by modulating or discontinuously applying the stirring current or the magnetic field, effective segregation coefficients of solute-solvent systems in the vicinities of liquid-solid interfaces may be continuously or discontinuously varied. Such a controlled effective segregation coefficient may result in a desired composition gradient in the crystallizing solid material or may be used in a normal freezing operation to offset the accumualtion or deletion of solute from the remaining molten material so as to produce a long region of uniform solute content.

Where it is desired to discontinue the stirring motion rapidly, the momentum of the agitating liquid may be offset by suddenly reversing the magnetic field or the direction of current flow.

The use of the passage of electrical current through a body of material undergoing zone-melting may serve purposes independent of agitation of a liquid material. For example, such current flow may result under certain circumstances in production of a molten zone by Joule heating; see my copending application Serial No. 630,804 filed December 27, 1956, or in the independent control of interface position by Peltier heating; see my copending application Serial No. 635,893, filed January 23, 1957. Since the degree of stirring of molten material in accordance with the instant invention is equally dependent upon the magnitude and direction of each of the two normal components of current flow and magnetic field, it is apparent that the advantage of Joule heating and also of Peltier heating, may be obtained by appropriate variations in field intensity while maintaining the stirring rate constant in accordance with this invention. It is also apparent that variations in stirring rates and in direction of stirring may result in desirable compensation of impurity segregation or in production of resistivity gradients or p-n junctions simultaneously with variations in direction or magnitude of current flow designed to obtain product characteristics made possible by Joule heating and Peltier heating.

The methods of this invention are such that the velocity of the liquid material may be estimated by use of fluid engineering equations. The reactive force produced by interaction of normal components of current flow and magnetic field are given by the equation $$F = HIL/10 \qquad (1)$$

where

F is the force in dynes,
I is the current through the liquid material in amperes
H is the mean magnetic intensity in oersteds, and
L is the length of molten zone (mean circumference of annulus) in centimeters.

The following example illustrates the use of Equation 1 in determining the fluid velocity of molten tin undergoing processing in accordance with a process of this invention.

*Example 1*

Assuming an ingot of annular cross-section having an area of 10 square centimeters, a mean zone circumference of 10 centimeters, a width of 1 centimeter, a zone length of 1 centimeter along the ingot axis, a current of 100 amperes (10 amperes per square centimeter), and a mean magnetic field intensity, H, of 1000 oersteds, the resulting force on the zone from Equation 1 is $10^5$ dynes. Equivalent pressure is $10^5$ dynes per square centimeter. The fluid velocity attainable for a metal such as tin having a density of about 7 grams per cubic centimeter is 25 centimeters per second.

This calculation is based on standard chemical engineering curves of Reynold's number against pipe friction, and will vary with the exact cross-sectional shape and roughness of the annular zone surface. (See, for example, Chemical Engineering, vol. I, by J. M. Coulson and J. F. Richardson, McGraw-Hill Company, New York, 1954, pages 31–32.) This velocity, for tin, is well within the range of turbulent flow, corresponding to a Reynold's number of about 20,000.

The following discussion equates the stirring velocity to the decrease in layer thickness δ and thereby shows the relationship between stirring velocity and segregation coefficient.

A relationship between $k_{eff}$ and δ has been derived by Burton, Prim, and Slichter (Journal of Chemical Physics, vol. 21, pages 1987–1996, 1953). It has been found to be reliable for metals and semiconductors such as germanium. The relationship is:

$$k_{eff} = \frac{1}{1 + \frac{(1-k_0)}{k_0} e^{-f\delta/D}} \quad (2)$$

where

δ is the enriched film thickness in cm.;
$f$ is the growth rate of the crystal (advance rate of zone in cm./sec.);
D is the diffusivity of the solute in the liquid, in cm.$^2$/sec.;
$k_0$ is the equilibrium value of $k_{eff}$ that obtains at extremely slow growth rates.

According to this relationship, $k_{eff}$ increases as $(f\delta/D)$ increases, for coefficients less than 1.

A relationship between δ, the so-called sublaminar film thickness, and Reynold's number, for a smooth (or somewhat rough) pipe has been derived from empirical experience in flow of fluids. For example, Coulson and Richardson, ibid., page 274, give the relation:

$$\delta = 62 d R_e^{-7/8} \cong \frac{62 \mu}{\rho D v} \quad (3)$$

where $R_e$, defined as $dv\rho/\mu$, is Reynold's number,
$v$ is velocity in cm./sec. along pipe (zone),
$\rho$ is density of liquid in cm.$^3$/sec.,
$d$ is pipe diameter (mean zone diameter),
$\mu$ is viscosity of liquid in poises.

From Equations 3 and 2 we find that in the above example, δ for liquid tin is about 0.007 cm. For natural convection alone, δ is of the order of 0.05 cm. or larger. Therefore, improvement in $k_{eff}$ has been achieved corresponding to a decrease of δ by a factor of about 14. The exact improvement depends on the $k_0$ for the particular impurity. In any event, as compared with natural convection, the forced convection due to magnetic stirring permits an increase of about 14 in the growth rate $f$, wtihout impairment of $k_{eff}$.

The invention has been discussed in terms of specific apparatus as generally applied to zone-melting. Other uses of the methods of this invention are apparent. The stirring methods herein are applicable to normal freezing operations and to all other operations in which it is desired for any reason to stir a liquid material having sufficient electrical conductivity to conduct a current of such magnitude as to result in a sufficient reactive force. Since the reactive force is equally dependent upon the magnitude of magnetic field intensity, the conductivity of the material to be stirred need not be great, it having been found that electromagnetic stirring methods are applicable not only to metallic materials, but also to materials having comparatively low conductivity as, for example, germanium and silicon having resistivities of the order of $10^{-3}$ ohm-centimeters in the liquid phase at their melting points. In this connection, it should be noted that the processes of this invention are not limited to operation on liquid materials having metallic type conductivity mechanism but are applicable to, for example, salt solutions in which electrical conductivity is ionic.

Although it is a general requirement that the liquid cross-section be hollow, it is not necessary that such section exist independently of the magnetic apparatus described herein, but may be produced, for example, by dipping a suitable magnetic pole directly into a melt contained in a single wall container so as to produce thereby the required annular section. These processes are also applicable to various procedures in which liquid materials are maintained in position without use of retaining walls as, for example, the floating zone method in which the liquid is held in position primarily by virtue of interfacial forces at an upper solid-liquid interface in a vertically disposed ingot. If the stirring processes of this invention are applied to a material undergoing such a crucibleless process, it is necessary to impose a maximum limit on the reactive force so as not to result in so rapidly moving a liquid as to produce displacement by centrifugal force.

What is claimed is:

1. The method of agitating a liquid material having a hollow cross-section comprising impressing a magnetic field in a radial direction across such material and causing an electrical current to flow through the material such that there is a component of current flow at an angle of 90 degrees to the direction of the said magnetic field, so that there is produced within the said material a force reactive to the said components of magnetic field and current flow thereby producing net liquid flow within the said material in a circumferential direction about the section.

2. The method of claim 1 in which the said liquid material is contiguous with and wets a solid body at at least one interface.

3. The method of claim 2 in which the said at least one interface is caused to progress into the liquid material.

4. The method of claim 1 in which the said liquid material is contiguous with and wets a solid body at two interfaces.

5. The method of claim 4 in which both interfaces are caused to progress one by freezing into the liquid material and the other by melting into the solid body.

6. The method of claim 1 in which the said hollow section is maintained by a double wall container.

7. The method of claim 6 in which at least one of the walls of the said container has projecting therefrom into the said liquid material baffles thereby increasing the turbulence of the liquid flow.

References Cited in the file of this patent

UNITED STATES PATENTS 2,729,088  Pfann _____ Mar. 20, 1956

FOREIGN PATENTS 555,214  Great Britain _____ Aug. 10, 1943